June 3, 1958  J. W. REARDON ET AL  2,837,671
COMMUTATOR BAR CONSTRUCTION
Filed Feb. 16, 1956
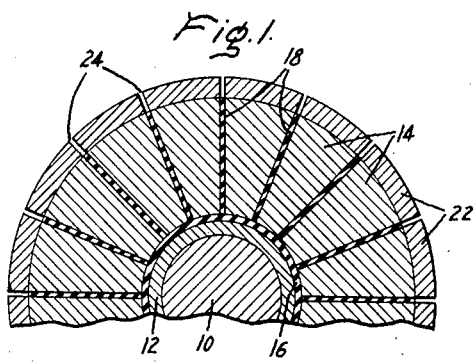
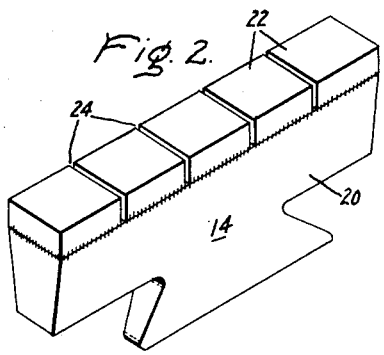
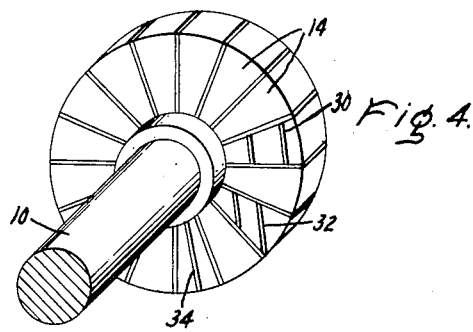
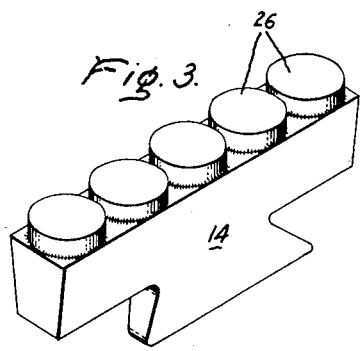
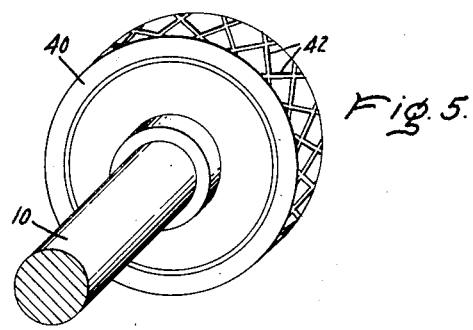
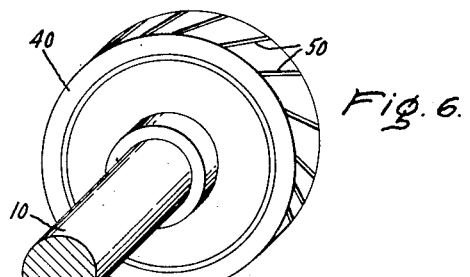
Inventors:
J. Willard Reardon,
Kenneth R. McDougal,
by Vernon F. Kall
Their Attorney.

2,837,671

COMMUTATOR BAR CONSTRUCTION

John W. Reardon and Kenneth R. McDougal, Erie, Pa., assignors to General Electric Company, a corporation of New York Application February 16, 1956, Serial No. 565,939

5 Claims. (Cl. 310—236)

The invention described herein relates to dynamoelectric machines and more particularly to an improved surface for a commutator bar and a collector ring and has for its object the provision of a structure capable of promoting cooling of the bar and ring for minimizing distortion thereof produced during operation of the machines.

One of the critical problems encountered in commutator bars and collector rings of the various types having a supporting member of steel, or other material, and being provided with a copper wearing surface of high electrical conductivity, is that, in operation, the bars comprising the commutator or the ring become heated, thereby producing unequal expansion of the steel and copper which causes distortion or warping of the copper wearing surface. The uneven surface resulting from the distortion causes non-uniform contact with the brushes, which in turn creates poor commutation, decreases current carrying capacity and accelerates brush wear.

In carrying out our invention, we minimize distortion of the commutator and ring surfaces and thereby reduce these deleterious effects by dividing the copper wearing surface of each bar or ring into a plurality of segments, each being separated from the other by air spaces. This structure improves cooling of the commutator and brushes and avoids unnecessary warping, thus resulting in increased current carrying capacity of the machine. These same advantages accrue to a collector ring when the surface is divided into a plurality of units.

For a more complete understanding of the invention, as will be hereinafter more particularly pointed out in the appended claims, reference is now made to the following description taken in connection with the accompanying drawings in which:

Figure 1 is a sectional view in elevation illustrating the arrangement of commutator bars on an armature shaft for forming the commutator of a machine;

Figure 2 is a perspective view of a conventional commutator bar of the type illustrated in Figure 1 showing the improved wearing surface of this invention;

Figure 3 is a modification of the commutator bar shown in Figure 2;

Figure 4 is a perspective view illustrating another embodiment of segmented surfaces formed on a face type commutator;

Figure 5 is a perspective view showing the application of a segmented surface on a collector ring; and Figure 6 is a modification of the collector ring shown in Figure 5.

Referring now to the drawings wherein like reference characters designate like or corresponding parts throughout the several views, there is shown in Figure 1, conventional construction of a commutator for a dynamoelectric machine comprising an armature shaft 10 having a clamping ring 12 arranged for holding the commutator bars 14 in fixed position on the shaft. An insulating sleeve 16 and strips of insulation 18 serve to electrically isolate each bar 14 from the other and from the bar supporting structure of the machine.

A single commutator bar 14, also of conventional construction, is shown in Figure 2. It is to be understood, as aforementioned, that this invention is directed to the commutator bar or collector ring surface and that the bar shown is for illustrative purposes only since there are many different types of bars and means for securing the bars to the armature shaft.

The bar 14 comprises a supporting member 20 of steel, or other material, having high strength and stiffness. Welded or otherwise affixed to the upper portion of supporting bar 14 is a plurality of copper segments 22 of generally quadrilateral configuration, each being spaced from one another by an air gap 24 to form the improved current collecting surface of this invention. It is evident that each segment 22 additionally may be divided into a plurality of units shaped in the form of triangles, rectangles or the like.

The air gap 24 arranged between each of the copper segments 22 provides for effective cooling of the commutator during machine operation by causing air to circulate around each of the segments for dissipating heat which can escape only through the outer surface of the commutator. This arrangement of the copper segments 22 on each commutator bar 14 also reduces the bimetallic effect which causes warping of the bars under heating due to the unequal expansion of the copper and steel. Further advantages that accrue to a machine having the segmented surface of this invention is that during rotation of the commutator, the cooling effect achieved increases the current-carrying capacity of the commutator to an extent not possible by those disclosed in the prior art. The reduction in temperature obtained by this manner of cooling, minimizes the marking and distortion caused in commutators of conventional design.

The segmented surface on commutator bar 14 shown in Figure 3, consists of a plurality of cylindrical discs 26 welded or otherwise affixed to the outer surface for contact by brushes (not shown) while simultaneously furnishing a plurality of passageways on the bar surface for facilitating the flow of air around each of the discs 26. As in the previous modification, the air reduces the temperature of the discs, thereby preventing warping or distortion of the bar surface and increasing the current carrying capacity of the copper segments. Since the function performed by the discs 26 is to facilitate the flow of air over the bar surface, it will be evident that the discs may assume any curvilinear configuration compatible with reasonable air flow properties. The discs also serve an additional function in that improved brush performance is obtained since the discs permit a greater amount of air to flow under the brush face thereby maintaining the brush at a lower operating temperature. The lower temperatures alternatively permit the brush to carry higher current densities and still stay within acceptable operating limits. These advantages accruing from the structure are also made possible by the non-constant cross section of the discs in a circumferential direction and because the brush is caused to make and break contact with discs at a non-linear rate.

The aforementioned teachings are also properly applicable to the face type of commutator shown in Figure 4. In this embodiment, the brush contacting surface for each bar increases in area radially from the center and slots or grooves 32 are formed in the contacting surface providing segments for effecting cooling of the commutator. As shown, the grooves are cut at an angle 32, but the precise angle shown is not critical. For example, slots or grooves may be formed in the face of each bar in a manner wherein they lie in a plane parallel with the shaft 10, or in the alternative, a single or plurality of grooves may extend radially in each bar from a point adjacent the shaft to the peripheral surface of the bar. Obviously, the various segments formed by the grooves on each bar may be replaced by individual segments welded on the bar surface in the manner of those illustrated in Figures 2 and 3.

The above description has been directed to the cooling of commutator bar surfaces but the principles herein disclosed are equally applicable to a collector ring 40 such as shown in Figure 5. In this species of the invention, grooves, channels or slots 42 of an off-center X variety are formed or otherwise made to form segments on the outer peripheral surface of the ring. Although this is a preferred form, Figure 6 shows still another embodiment in which the slots are diagonally formed in the outer ring surface for facilitating cooling of the ring 40. Straight circular grooves or herring-bone slots (not shown) may also be formed on the collector ring surface for securing the same results.

Obviously many modifications and variations are possible in light of the above teachings. It is therefore to be understood that within the scope of the appended claims, the invention may be practiced otherwise than as specifically described.

What we claim as new and desire to secure by Letters Patent of the United States is:

1. A current collector for use with a dynamoelectric machine comprising a core of material having a conducting wearing surface formed on a face of said core adapted for contact by brushes, said wearing surface comprising a material having a temperature coefficient of expansion different than said core, a plurality of spaced grooves in said wearing surface extending at an angle to a line drawn through the axis of said surface and extending inwardly at right angles therefrom to said core so as to divide said wearing surface into a plurality of segments wherein each individual segment is individually attached to said core and out of contact with those adjacent to it, thereby permitting improved cooling of said wearing surface and reducing the adverse effects of differential thermal expansion occurring between said core of material and said wearing surface.

2. A commutator bar for use with a dynamoelectric machine comprising a core of material having means on one end adapted for connection to a shaft and a conductive wearing surface on the other end thereof, said wearing surface comprising a plurality of spaced electrically conductive segments individually attached to said core material and spaced along the length thereof for promoting self-cooling of said wearing surface.

3. A commutator bar for use with dynamoelectric machines comprising a core of material having means on one end adapted for connection to a shaft and having a coefficient of expansion different than a wearing surface affixed to the other end thereof, said wearing surface comprising a plurality of spaced electrically conductive segments of rectilinear configuration individually attached to said core material and spaced along the lentgh thereof for promoting self-cooling of said wearing surface.

4. The combination as claimed in claim 3 wherein said conductive segments are of curvilinear configuration.

5. A face type commutator bar for use in a commutator adapted for connection to a shaft of a dynamoelectric machine comprising a core of material having means on one end for connection to said shaft and having a coefficient of expansion different from that of a wearing surface formed on a face of said core, said wearing surface comprising a plurality of individual electrically conductive segments on said face extending radially from said shaft toward the outer surface of said core.

References Cited in the file of this patent

UNITED STATES PATENTS

| | | |
|---|---|---|
| 994,480 | Reeves | June 6, 1911 |
| 1,014,253 | Platischer | Jan. 9, 1912 |
| 1,713,089 | Phillips | Jan. 3, 1927 |
| 1,944,952 | Rouge et al. | Jan. 30, 1934 |

FOREIGN PATENTS

| | | |
|---|---|---|
| 302,383 | Germany | Dec. 12, 1917 |